United States Patent
Dam et al.

(10) Patent No.: US 6,781,287 B1
(45) Date of Patent: Aug. 24, 2004

(54) NON-CONTACTING ULTRASONIC TRANSDUCER

(75) Inventors: Naim Dam, Muttontown, NY (US); Glen Melder, Lake Ronkonkoma, NY (US)

(73) Assignee: Cosense, Inc., Hauppauge, NY (US)

( * ) Notice: Subject to any disclaimer, the term of this patent is extended or adjusted under 35 U.S.C. 154(b) by 206 days.

(21) Appl. No.: 10/178,151

(22) Filed: Jun. 24, 2002

(51) Int. Cl.[7] .............................................. H01L 41/08
(52) U.S. Cl. ...................................... 310/334; 310/336
(58) Field of Search ................................ 310/334, 336, 310/337

(56) References Cited

U.S. PATENT DOCUMENTS

| | | | | |
|---|---|---|---|---|
| 2,532,507 A | * | 12/1950 | Meunier | 310/336 |
| 3,239,801 A | * | 3/1966 | McGaughey | 367/150 |
| 3,497,728 A | * | 2/1970 | Ostrofsky et al. | 310/336 |
| 3,663,842 A | * | 5/1972 | Miller | 310/338 |
| 4,214,484 A | * | 7/1980 | Abts | 73/632 |
| 4,630,245 A | * | 12/1986 | Dam | 367/93 |
| 4,907,573 A | * | 3/1990 | Nagasaki | 601/4 |
| 5,214,343 A | * | 5/1993 | Baumoel | 310/334 |

FOREIGN PATENT DOCUMENTS

| | | | | |
|---|---|---|---|---|
| US | H1290 | * | 2/1994 | 367/140 |

* cited by examiner

*Primary Examiner*—Mark Budd
(74) *Attorney, Agent, or Firm*—Gordon D. Coplein

(57) ABSTRACT

An ultrasonic transducer for sensing liquid within an article, such as a vassel or pipe, without contacting the liquid has a body, a sealed capsule of a flexible material containing a liquid capable of transmitting ultrasonic energy carried by the body from which a head portion of the capsule extends to contact a wall of the article. Within the body is a piezo-electric element in contact with a portion of the sealed capsule to transmit ultrasonic energy to and receive energy from the liquid in said capsule as it passes through the capsule head without the need for a coupling compound.

12 Claims, 1 Drawing Sheet

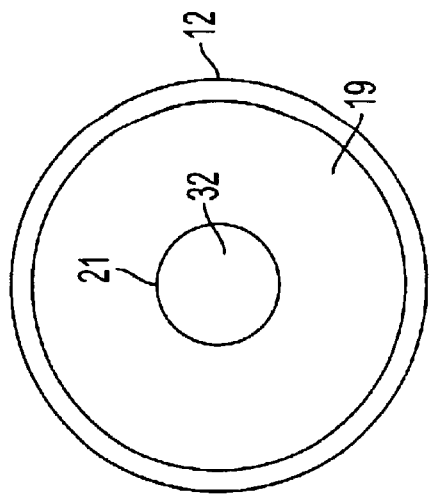
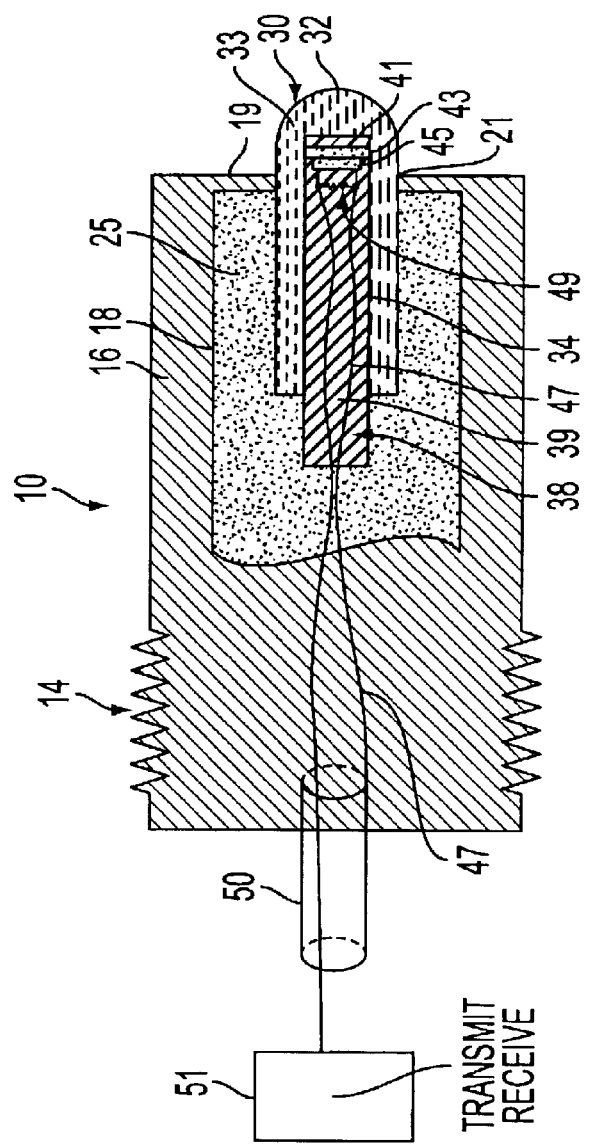

NON-CONTACTING ULTRASONIC TRANSDUCER

FIELD OF THE INVENTION

The invention relates to ultrasonic transducers of the type that do not have to contact the liquid to sense its presence and more particularly to one which can sense the liquid in a vessel or pipe without the need of a coupling compound between the transducer and the vessel or pipe.

BACKGROUND OF THE INVENTION

Transducers for transmitting and receiving ultrasonic energy in applications involving liquids are well known. A typical application for such transducers is in liquid level sensing to sense the height of a liquid in a container or other vessel, such as a tank. Another application is in flow meters where the rate of flow in a pipe is measured. The most widely used form of such transducer has a housing that contains a piezo-electric element. The housing is mounted to the vessel or pipe with the front end of the housing extending trough a hole placed to be in direct contact with the liquid. The ultrasonic energy is coupled directly to the liquid to sense its presence or the energy dissipates in air when no liquid is present.

Another type of ultrasonic transducer is of the non-contact type, such as disclosed in U.S. Pat. No. 4,630,245, granted Dec. 16, 1986. Here, the transducer housing is of a rigid material, such as a plastic, and is fixedly mounted, such as by a clamp or strap, to the outside of the vessel or pipe in which the liquid being sensed is present. While the non-contact type transducer has an advantage in that no hole has to be made in the vessel or pipe to which it is mounted, it requires a coupling compound, such as Vaseline, or silicon grease, between the housing and the vessel or pipe. The coupling compound is needed so that there will be no air gaps between the transducer housing and the vessel or pipe since this would adversely affect the transmission and reception of the ultrasonic energy from the transducer to the wall of the vessel or pipe and thereafter to the liquid or air therein.

Application of the coupling compound in the foregoing type of non-contact transducer is another step required in the mounting of the transducer. Also, the need for using a coupling compound also limits the use of such a transducer, for example, in an application for sensing the liquid level in bottles moving rapidly past a fixed inspection point on an assembly line. Here, it would not be possible to apply the coupling compound to each of the bottles. Also, in some applications, the use of a coupling compound can adversely affect the appearance of the pipe or vessel. Further, in sensitive sanitary applications such as drug and food processing, the use of such coupling compound should or must be avoided. Another disadvantage in this type of non-contact transducer is that it is fixed in position and cannot be easily moved. Accordingly, a need exists for a non-contact type ultrasonic transducer that is not subject to these limitations.

BRIEF DESCRIPTION OF THE INVENTION

In accordance with the invention, a non-contacting type ultrasonic transducer is provided having a housing in which the piezo-electric element is mounted in contact with a sealed capsule of a membrane of a flexible material. The capsule contains a material, such as a liquid or grease, capable of transmitting ultrasonic energy. A part of the flexible membrane of the capsule, which can be dome shaped, extends out of the front of the transducer housing and makes contact with the article, such as a vessel, pipe, or container or other member, that contains the liquid to be sensed. The capsule front end is pressed against the article and deforms to thereby make a good coupling with the article wall. Ultrasonic energy is transmitted from the piezo-electric element through the capsule membrane in the transducer housing, the liquid in the capsule liquid and the portion of the capsule that extends from the housing to the wall of the article and the liquid, or absence of liquid, contained therein that is being sensed. When there is liquid in the article at the level of contact of the transducer membrane, the path is reversed on the return trip of the ultrasonic energy through the capsule and its liquid to the piezo-electric element. When no liquid is present in the article, the energy dissipates and there is no return energy to be received by the piezo-electric element.

The transducer of the invention can be operated by and used with a variety of conventional ultrasonic devices, such as used for measuring liquid level, liquid flow rate or other similar application and applications requiring a momentary contact such as sensing the liquid level in bottles or cans moving past an inspection station in an assembly line. The use of the deformable capsule does not require any coupling compound. Therefore, no time or effort is required to apply the coupling compound and no residue of a compound is left on the wall of the article. Since the transducer does not have to be fixedly mounted to the article, it can be used in a portable manner.

OBJECTS OF THE INVENTION

It is an object of the invention to provide an ultrasonic transducer of the non-contact type.

A further object is to provide a non-contacting type ultrasonic transducer for sensing the presence or absence of liquid in an article in which no coupling compound is required between the transducer housing and the article wall.

Yet another object is to provide a non-contacting type ultrasonic transducer having a deformable member that contacts the wall of the article containing liquid being sensed to couple ultrasonic energy to and from liquid contained in the article.

BRIEF DESCRIPTION OF THE DRAWINGS

Other objects and advantages of the prevent invention will become more apparent upon reference to the following specification and annexed drawings in which:

FIG. 1 is a longitudinal cross-section view of the transducer; and

FIG. 2 is a front view.

DETAILED DESCRIPTION OF THE INVENTION

Referring to FIGS. 1 and 2, the transducer 10 is formed by an outer shell 12, which can be of metal or plastic. The shell 12 is illustratively shown as cylindrical in shape but any other shape can be used, such as rectangular or part cylindrical and part rectangular or any other suitable desired shape. The rear end of the shell 12 is illustratively shown as having threads 14 to mount the transducer to a corresponding threaded member. Of course, the shell can have no or any conventional type of mounting, such as a strap or clamp, suitable for the application in which the transducer is being used. Alternatively, the transducer can be hand held or mounted on an adjustable fixture. If desired, the shell can be omitted.

Within shell 12 is a body 16 of a suitable material such as epoxy, whose shape conforms to the shell interior. If the shell is omitted the body can de formed with threads or have a slot through which a mounting strap can pass. A bore 18, illustratively of a cylindrical shape, is formed part way into the body 16 from its front end with the bore front end being closed by a window 19 that has an opening 21. The window 19 can be formed in the last step of making the transducer and can be a disk of plastic, epoxy or TEFLON attached by an adhesive. Alternatively, a separate window can be omitted and the end of the body form the transducer front end.

A sealed capsule 30 of a flexible material, such as Neoprene rubber, latex, GE 636 Blue rubber, or similar material that is flexible and deformable, is held within the bore 18. A suitable element to form the capsule is a rubber boot available from Allied Electronics of Bristol Pa. under part number 860-4480. Any suitable rubber or member of deformable plastic material can be used. The wall thickness depends on a variety of factors, such as the type of material, transmission fluid used with it and the power applied to the transducer. The capsule 30 has an inner wall and an outer wall with a head portion 32 that extends forward of the body front end window 19. The sealed capsule 30 is shaped in the form of a hollow tube with the head 32 that extends from the body window in the shape of a dome, i.e., rounded. The rear part of the capsule 30 within the body bore 18 has a cylindrical or other suitable shape blind bore 34 that terminates at the capsule inner wall. The interior of the sealed capsule 30 is filled with a liquid 33 that can transmit ultrasonic energy, preferably with as low a loss as possible. A suitable liquid is Dow Corning 710 R fluid. Any other suitable equivalent type liquid or oil can be used.

A tubular internal housing 38, preferably of a metal such as stainless steel, has a front portion located in the capsule blind bore 34 and a rear portion that extends into the body bore 18. The body bore 18 is filled with a flexible epoxy material 25, such as Emerson & Cumming, cryogenic epoxy, 26S. This holds the capsule 30 and internal housing 38 in place in the body 16 and affords sufficient expandability to accommodate for expansion and contraction of capsule 30.

A first window 41 of a material, such as TEFLON, through which ultrasonic energy can pass is attached to the front end of the internal housing 38. Preferably, the entire front surface of the first window 41 is in firm contact with the inner wall of the flexible capsule 30. A second window 43, such as of epoxy, is in back of and in firm contact with the back surface of the first window 41. The first an second windows can be of any suitable shape, such as circular. A piezo-electric element 45, such as of PZT, is mounted on the back surface of the second window 43. The piezo-electric element 45 can be of any shape, such as square, rectangular, or round and it is mounted to the rear surface of the second window 43 by a suitable adhesive. The piezo-electric element 45 has a pair of electrodes, as is conventional.

Each one of a pair of lead wires 47 in the internal housing 38 has its end connected to an electrode of the piezo-electric element 45. The interior of the internal housing 38 is filled with a rubber material 39, which can be of the same type as that forming the capsule 30, and the wires 47 are held by this material. The portion of the wires 47 extending from the internal housing 38 are embedded in the rear portion of the epoxy body 16. If desired, an impedance matching element or elements 49, such as a resistor and/or capacitor, can be connected across the wires 47. While the impedance matching elements 49 are shown within the internal housing 38, they also can be within the body bore 18.

The wires 47 in the internal housing 38 are the terminal ends of a coaxial cable 50 whose other end is connected to an electronic circuit 51 that powers the transducer. The circuit 51 can be that of an ultrasonic liquid level sensor or flow meter and operate at any suitable frequency, such for example, 250 KHz to 5 MHz. The circuit 51 provides the ultrasonic energy to the piezo-electric element 45 for transmission and receives energy that is reflected back to the piezo-electric element. Such circuits are well known in the art and the transducer 10 can be used with any compatible circuit.

A process for making the transducer 10 follows. First, the piezo-electric crystal element 45 is selected for the required operating frequency, which can illustratively be from 250 Khz–5 MHZ. Electrodes are plated on the crystal and the ends of the two wires 47 are attached. A layer of epoxy, which forms the second window 43, has one surface affixed to the front surface of the crystal element and the other surface to the first window 41. The assembly of the crystal, windows and wires is inserted into the internal housing 38 and the impedance matching element(s) 49 connected. The interior of the internal housing 38 is then filled with the material 39 to provide a secure mounting and this assembly is inserted into the capsule central blind bore 34. The interior of the capsule 30 is then filled with the transmission liquid 33, such as by use of a hypodermic needle, and the hole for the needle is sealed. The rigid body 16 is formed and the shell 12, if used, is mounted onto the body 16. The assembly of the capsule 30 and interior housing are held in the body bore 18 while it is filled with the flexible epoxy 25.

In the use of the transducer 10, the capsule head 32 is brought into contact with the outside surface of the wall of the article containing the liquid to be sensed. When contact is made, the head 32 deforms against the article wall. A coupling is effected that permits the transmission and reception of ultrasonic energy between the piezo-electric element 45 and the article wall. The time of contact of the capsule head 32 with the article wall needed depends on the type of article, wall thickness and timing of signals produced by the circuit 51.

As described in the aforesaid U.S. Pat. No. 4,630,245, the ultrasonic energy transmitted by the transducer piezo-electric element 45 is coupled to the wall defining the article and passes into the article interior. If there is a liquid present in the article at the level of the point of entry of the ultrasonic energy, the energy travels to the article opposing wall, is reflected and passes back through the wall at the point of energy entry back to the transducer piezo-electric element where it is received and transmitted to the circuit 51 receiver for detection and production of any desired signal, such as an alarm. If there is no liquid in the article at the point of entry of the ultrasonic energy, the energy dissipates in the empty space (air) and is not reflected by the article opposing wall for detection. In a flow meter type application, the ultrasonic energy enters the article wall and its return is modified by the flow rate of the liquid in the article.

The transducer 10 of the intention is used in conventional applications, such as measuring liquid level in a vessel from a vessel side wall, point level sensing, or from the bottom of the vessel in a "bottom up" continuous measurement application that determines the height of the liquid in the vessel. It can also be used in an assembly line type operation to contact the wall of vessels, such as bottles, sequentially moving past the transducer. One or more of the transducers can be placed on the outer wall of a pipe to sense the flow rate of a liquid within the pipe. It also can be mounted in a portable hand held device for liquid level or flow rate measurement.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

We claim:

1. An ultrasonic transducer for sensing liquid within an article without contacting the liquid comprising:

a body having a bore;

a sealed capsule containing a fluid capable of transmitting ultrasonic energy carried by said body and having a portion with a blind bore located within said body bore and a deformable head portion extending outwardly of said body to contact the article; and an internal housing within said capsule blind bore carrying a piezo-electric element in contact with a portion of said sealed capsule to transmit ultrasonic energy to and receive energy from said fluid in said capsule.

2. An ultrasonic transducer as in claim 1 wherein said capsule head portion is both deformable and flexible.

3. An ultrasonic traducer as in claim 1 wherein said entire capsule is of a flexible material.

4. An ultrasonic transducer as in claim 1 wherein said transmission fluid is oil.

5. An ultrasonic transducer as in claim 1 wherein said internal housing is of metal.

6. An ultrasonic transducer for sensing liquid within an article without contacting the liquid comprising:

a body;

a sealed capsule containing a liquid capable of transmission of ultrasonic energy carried by said body, said capsule having a head portion that is deformable extending therefrom to contact the article and being formed with a blind bore;

an internal housing containing a piezo-electric element within said capsule blind bore, said piezo-electric element being in contact with a portion of said sealed capsule to transmit ultrasonic energy to and receive energy from the liquid in said capsule; and a flexible material filling said body bore to hold said capsule.

7. An ultrasonic transducer as in claim 4 wherein said piezo-electric element has an operating frequency in the range of from about 250 KHz to about 5 MHz.

8. An ultrasonic transducer as in claim 3 wherein the material of said capsule is of one of rubber and plastic.

9. An ultrasonic transducer as in claim 1 and further comprising a flexible material filling said body bore to hold said internal housing and said portion of said capsule that is within body bore to said body.

10. An ultrasonic transducer as in claim 1 wherein said capsule is of a deformable material that fits over and surrounds a portion of said internal housing.

11. An ultrasonic transducer as in claim 10 and further comprising a material filling said body bore to hold said internal housing and said portion of said capsule that is within body bore to said body.

12. An ultrasonic transducer as in claim 11 wherein said material filling said body bore is flexible.

* * * * *